(12) United States Patent
Zhao et al.

(10) Patent No.: US 9,253,082 B2
(45) Date of Patent: Feb. 2, 2016

(54) FAILURE DETECTION IN THE MULTIPROTOCOL LABEL SWITCHING MULTICAST LABEL SWITCHED PATH'S END-TO-END PROTECTION SOLUTION

(71) Applicant: Futurewei Technologies, Inc., Plano, TX (US)

(72) Inventors: Qianglin Quintin Zhao, Boxborough, MA (US); Ying Chen, Clearwater, FL (US)

(73) Assignee: Futurewei Technologies, Inc., Plano, TX (US)

( * ) Notice: Subject to any disclaimer, the term of this patent is extended or adjusted under 35 U.S.C. 154(b) by 338 days.

(21) Appl. No.: 13/649,979

(22) Filed: Oct. 11, 2012

(65) Prior Publication Data

US 2013/0088953 A1 Apr. 11, 2013

Related U.S. Application Data

(60) Provisional application No. 61/545,897, filed on Oct. 11, 2011.

(51) Int. Cl.
| | |
|---|---|
| *H04L 12/703* | (2013.01) |
| *H04L 12/26* | (2006.01) |
| *H04L 12/707* | (2013.01) |
| *H04L 12/753* | (2013.01) |
| *H04L 12/723* | (2013.01) |

(52) U.S. Cl.
CPC .............. *H04L 45/28* (2013.01); *H04L 43/10* (2013.01); *H04L 45/22* (2013.01); *H04L 45/48* (2013.01); *H04L 45/50* (2013.01)

(58) Field of Classification Search
USPC ........... 370/217–228, 237, 238, 238.1, 395.5, 370/396, 397, 400–410; 709/239, 243
See application file for complete search history.

(56) References Cited

U.S. PATENT DOCUMENTS

| | | |
|---|---|---|
| 2009/0219806 A1 | 9/2009 | Chen et al. |
| 2009/0262651 A1* | 10/2009 | Liu .................................. 370/242 |
| 2011/0069609 A1 | 3/2011 | Le Roux et al. |
| 2011/0199891 A1* | 8/2011 | Chen ............................. 370/218 |
| 2012/0170573 A1* | 7/2012 | Poscher ........................ 370/352 |
| 2013/0064219 A1* | 3/2013 | Siomina et al. ............... 370/331 |

OTHER PUBLICATIONS

Cisco, "Bidirectional Forwarding Detection for OSPF", 2005, Cisco. http://www.cisco.com/en/US/technologies/tk648/tk365/tk480/technologies_white_paper0900aecd80244005.pdf.*

(Continued)

*Primary Examiner* — Hoon J Chung
(74) *Attorney, Agent, or Firm* — Conley Rose, P.C.; Grant Rodolph; William H. Dietrich

(57) ABSTRACT

In one aspect, the invention includes, in a root node along a secondary label switching path, a computer program product comprising computer executable instructions stored on a non-transitory medium that when executed by a processor cause the root node to perform the following: establish a first data plane based failure detection session having an inactive status along a first label switching path (LSP) with at least one leaf node, receive a predetermined number of notification messages from the leaf node, wherein the predetermined number of notification messages indicate the failure of a second data plane based failure detection session along a second LSP from a second processor to the leaf node, and change the status of the first data plane based failure detection session to active along the first LSP upon receipt of the predetermined number of notification messages.

20 Claims, 6 Drawing Sheets

(56) References Cited

OTHER PUBLICATIONS

Chen M., Ed., et al., "Return Path Specified LSP Ping," draft-ietp-mpls-return-path-specified-lsp-ping-03.txt, Jul. 11, 2011, 22 pages.

Saxena S., Ed., et al., "Detecting Data Plane Failures in Point-to-Multipoint Multiprotocol Label Switching (MPLS)—Extensions to LSP Ping," draft-ietf-mpls-p2mp-lsp-ping-18.txt, Sep. 2, 2011, 29 pages.

Foreign Communications From A Counterpart Application, PCT Application PCT/CN2012/059800, International Search Report, dated Feb. 5, 2013, 5 pages.

Foreign Communication From A Counterpart Application, PCT Application PCT/CN2012/059800, Written Opinion dated Feb. 5, 2013, 9 pages.

Katz, D., et al., "Bidirectional Forwarding Detection (BFD)," RFC 5880, Jun. 2010, 50 pages.

Wijnands, I.J., Ed., et al., "Label Distribution Protocol Extensions for Point-to-Multipoint and Multipoint-to-Multipoint Label Switched Paths," RFC 6388, Nov. 2011, 40 pages.

Aggarwal, R., et al., "MPLS Upstream Label Assignment for LDP," RFC 6389, Nov. 2011, 14 pages.

Saxena, S., Ed., et al., "Detecting Data-Plane Failures in Point-to-Multipoint MPLS—Extensions to LSP Ping," RFC 6425, Nov. 2011, 29 pages.

* cited by examiner

FAILURE DETECTION IN THE MULTIPROTOCOL LABEL SWITCHING MULTICAST LABEL SWITCHED PATH'S END-TO-END PROTECTION SOLUTION

CROSS-REFERENCE TO RELATED APPLICATIONS

This application claims priority to U.S. Provisional Application No. 61/545,897, filed Oct. 11, 2011 titled "Failure Detection in the Multiprotocol Label Switching Multicast Label Switched Path's End-to-End Protection Solution," which is incorporated herein by reference in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

The Multi-Protocol Label Switching (MPLS) Label Distribution Protocol (LDP) can be used to set up Point-to-Multipoint (P2MP) and Multipoint-to-Multipoint (MP2MP) Label Switched Paths (LSPs) in a network. The set of LDP extensions for setting up P2MP or MP2MP LSPs may be referred to as multipoint LDP (mLDP), which may be specified in Internet Engineering Task Force (IETF) Request for Comments (RFC) 6388, titled "Label Distribution Protocol Extensions for Point-to-Multipoint and Multipoint-to-Multipoint Label Switched Paths", which is hereby incorporated by reference. Certain Upstream Label Assignment (ULA) techniques may be specified in IETF RFC 6389, titled "MPLS Upstream Label Assignment for LDP", which is hereby incorporated by reference.

Service providers continue to deploy real-time multicast applications using mLDP across MPLS networks. There is a clear need to protect these real-time applications and to provide the shortest switching times in the event of failure. The current practice for protecting services and higher applications includes the pre-computation and establishment of a backup path. Under such practices, once a failure has been detected on the primary path, traffic should be rerouted to the backup path using the control plane. However, when the node of a first P2MP LSP fails, the delay for a second external network or a client to determine the failure and switch to a second egress node for receiving the traffic may be long. Such delay may not be acceptable in some systems, e.g., for real time services such as Internet Protocol (IP) television (IPTV).

SUMMARY

In one aspect, the invention includes, in a root node along a secondary label switching path, a computer program product comprising computer executable instructions stored on a non-transitory medium that when executed by a processor cause the root node to perform the following: establish a first data plane based failure detection session having an inactive status along a first label switching path (LSP) with at least one leaf node, receive a predetermined number of notification messages from the leaf node, wherein the predetermined number of notification messages indicate the failure of a second data plane based failure detection session along a second LSP from a second processor to the leaf node, and change the status of the first data plane based failure detection session to active along the first LSP upon receipt of the predetermined number of notification messages.

In another aspect, the invention includes, in a leaf node of a network comprising a plurality of label switching paths, a network component comprising a processor configured to establish a first data plane based failure detection session with a first head node along a first label switching path (LSP), wherein the first data plane based failure detection session has an active status, establish a second data plane based failure detection session with a second head node along a second LSP, wherein the second data plane based failure detection session has an inactive status, and send a notification message to the second head node upon a trigger event, wherein the notification message indicates a transmission failure along the first LSP.

In yet another aspect, the invention includes, in a network system comprising a plurality of label switching paths with at least one leaf node, a method of switching transmission from a first LSP to a second LSP upon failure in the first LSP comprising: establishing a first LSP, establishing a first data plane based failure detection session between a first head node and at least one leaf node on the first LSP, wherein the data plane based failure detection session messages indicate that the first LSP is active, establishing a second LSP, receiving an indication that the first LSP failed, wherein the indication comprises non-receipt of at least one data plane based failure detection session message from the first head node, and sending a notification message to the second head node indicating failure of the first LSP from the leaf node.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Current control plane based signaling mechanisms for failure detection are complex and slow, normally taking about a second for the detection of the failure. This disclosure introduces a simple and fast data plane based signaling mechanism among the head node and the tail end nodes of the multicast LSP. The mechanism of this disclosure may act like a heartbeat, e.g., by pulsing detection messages from the head node to the leaf node(s) for both a primary LSP and a secondary LSP. Upon interruption of the primary LSP heartbeat, the system may send a notification to the backup LSP tree head, and backup traffic forwarding may commence through the backup LSP. Once the tail end node receives backup traffic along the backup LSP, the tail end node may notify the head node of the failed former-primary LSP that the switchover has occurred. When the head node of the failed former-primary LSP receives notification of a switchover, traffic forwarding along the former-primary LSP ceases, completing the switchover. The data plane based signaling mechanism may also indicate the number of failed leaves in the primary tree.

Figure 1:
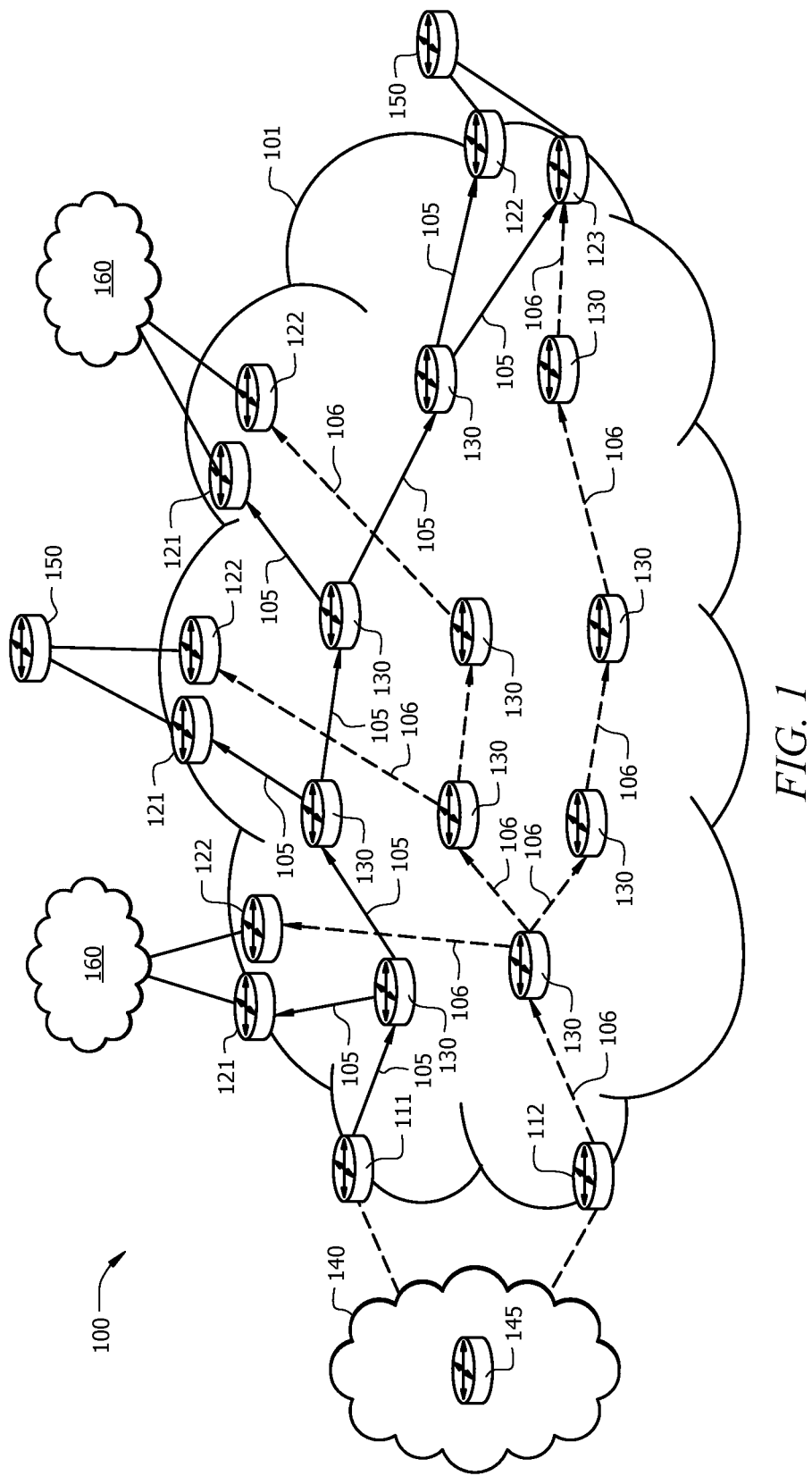
FIG. 1 depicts a schematic diagram of an embodiment of a label switched system.

FIG. 1 depicts one embodiment of a label switched system 100, where a plurality of P2P LSPs and P2MP LSPs may be established between at least some of the components. The P2P LSPs and P2MP LSPs may be used to transport data traffic, e.g., using packets and packet labels for routing. The label switched system 100 may comprise a label switched network 101, which may be a packet switched network that transports data traffic using packets or frames along network paths or routes. The packets may route or switch along the paths, which a label switching protocol, such as MPLS or generalized MPLS (GMPLS), may establish.

The label switched network 101 may comprise a plurality of edge nodes, including a first ingress node 111, a second ingress node 112, a plurality of first egress nodes 121, and a plurality of second egress nodes 122. When a P2MP LSP in the label switched network 101 comprises ingress and egress edge nodes, the first ingress node 111 and second ingress node 112 may be referred to as root nodes or head nodes, and the first egress nodes 121 and second egress nodes 122 may be referred to as leaf nodes or tail end nodes. Additionally, the label switched network 101 may comprise a plurality of internal nodes 130, which may communicate with one another and with the edge nodes. In addition, the first ingress node 111 and the second ingress node 112 may communicate with a source node 145 at a first external network 140, such as an Internet Protocol (IP) network, which may be coupled to the label switched network 101. Furthermore, first egress nodes 121 and second egress nodes 122 may communication with destination nodes 150 or other networks 160. As such, the first ingress node 111 and the second ingress node 112 may transport data, e.g., data packets, from the external network 140 to destination nodes 150.

In an embodiment, the edge nodes and internal nodes 130 (collectively, network nodes) may be any devices or components that support transportation of the packets through the label switched network 101. For example, the network nodes may include switches, routers, or various combinations of such devices. Each network node may comprise a receiver that receives packets from other network nodes, a processor or other logic circuitry that determines which network nodes to send the packets to, and a transmitter that transmits the packets to the other network nodes. In some embodiments, at least some of the network nodes may be LSRs, which may be configured to modify or update the labels of the packets transported in the label switched network 101. Further, at least some of the edge nodes may be label edge routers (LERs), which may be configured to insert or remove the labels of the packets transported between the label switched network 101 and the external network 140.

The label switched network 101 may comprise a first P2MP LSP 105, which may be established to multicast data traffic from the first external network 140 to the destination nodes 150 or other networks 160. The first P2MP LSP 105 may comprise the first ingress node 111 and at least some of the first egress nodes 121. The first P2MP LSP 105 is shown using solid arrow lines in FIG. 1. Typically, to protect the first P2MP LSP 105 against link or node failures, the label switched network 101 may comprise a second P2MP LSP 106, which may comprise the second ingress node 112 and at least some of the second egress nodes 122. The second P2MP LSP 106 is shown using dashed arrow lines in FIG. 1. Each second egress node 122 may be paired with a first egress node 121 of the first P2MP LSP 105. The second P2MP LSP 106 may also comprise some of the same or completely different internal nodes 130. The second P2MP LSP 106 may provide a backup path to the first P2MP LSP 105 and may be used to forward traffic from the first external network 140 to the first P2MP LSP 105 or second P2MP LSP 106, e.g., to egress node 123, when a network component of P2MP LSP 105 fails.

When a component of P2MP LSP 105 fails, rerouting traffic via a corresponding second P2MP LSP 106 may cause a delay in traffic delivery. Even when the second P2MP LSP 106 carries the same traffic as the first P2MP LSP 105, when the network component of the first P2MP LSP 105 fails, the delay for the first P2MP LSP 105 or second P2MP LSP 106 to determine the failure and switch to a backup path for transmitting the traffic may be long. Such delay may not be acceptable in some systems, e.g., for real time services such as IPTV.

Figure 2:
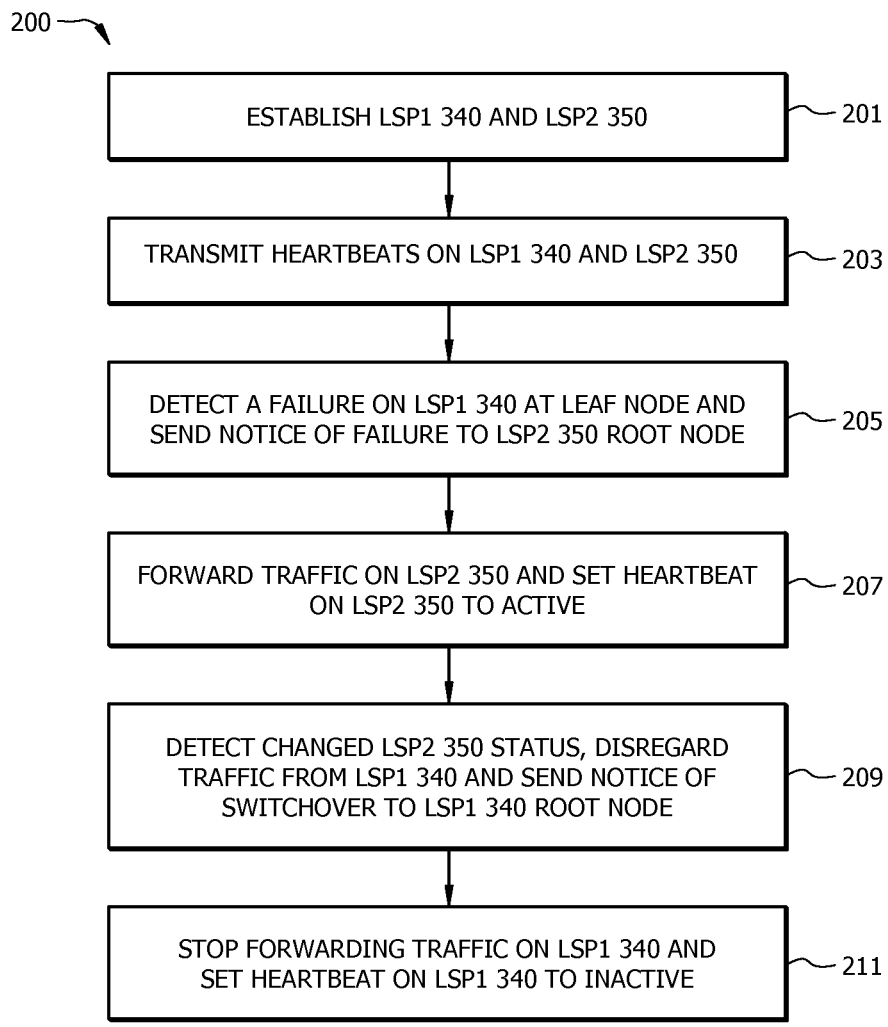
FIG. 2 depicts a flowchart for an embodiment of failure detection method in the MPLS multicast-LSP' s (mLSP) end-to-end protection solution.

FIG. 2 depicts a flowchart for an embodiment of failure detection in the MPLS mLSP's end-to-end protection solution. The process 200 may begin at 201 by establishing a primary and a secondary LSP. For example, in FIG. 1 first ingress node 111 may establish a first P2MP LSP 105 between first ingress node 111 and egress node 123 and second ingress node 112 may establish a second P2MP LSP 106 between second ingress node 112 and egress node 123.

Data plane based failure detection sessions, also referred to herein as a heartbeats, may be setup on LSP1 and LSP2 as shown at 203. Data plane based failure detection sessions may comprise a series of messages transmitted at predetermined intervals to (a) inform downstream nodes which LSP is active and/or primary and (b) verify path continuity. In one embodiment, the data plane based failure detection sessions for LSP1 and LSP2 may comprise two separate unidirectional failure detection (UFD) sessions having control message flags set to active and inactive, respectively. UFD is a subset of the bidirectional forwarding detection (BFD) protocol, used to detect a MPLS LSP data plane failure, and may generally utilize the same message protocols as traditional BFD. BFD is designed for the ingress node, e.g., the first ingress node 111 of FIG. 1, to detect a loss of connectivity to the egress node, e.g., the egress node 123 of FIG. 1, along with providing the ingress node with some optional mechanisms to track the connectivity. Under UFD protocols, the ingress node does not require or receive a response message. BFD and UFD protocols are known in the art, with additional information available in IETF RFC 5880, titled "Bidirectional Forwarding Detection (BFD)," incorporated herein by reference.

LSP1 and LSP2 may be established in any order, separately or concurrently. The LSP heartbeats, which are UFD sessions in the embodiment of FIG. 2, may likewise be established separately or concurrently in any order once the relevant LSPs are established. For example, in another embodiment the heartbeat of LSP2 is not established until after failure of LSP1 is detected. Once established, one or more leaf nodes may receive heartbeats from both LSP1 and LSP2. For example, in FIG. 1 the egress node 123 may receive heartbeats from first ingress node 111 over the first LSP 105 and may receive heartbeats from second ingress node 112 over second the LSP 106.

Using data plane based failure detection session protocols, leaf nodes in the system may be configured to expect to receive periodic heartbeats from the root nodes of the LSPs. A leaf node may detect a failure by not receiving a predetermined number of expected heartbeats from the root node.

As shown at 205, upon failure detection, a leaf node may send notice of traffic failure on LSP1 to the root node of LSP2. For example, in FIG. 1, if the egress node 123 detects a heartbeat interruption from first ingress node 111 over the first LSP 105, the egress node 123 may send a notice of traffic failure to second ingress node 112. As shown in 207, upon receipt of notice of traffic failure on LSP1, the root node of LSP2 may begin forwarding traffic on LSP2 to the leaf node and set the relevant heartbeat to active. For example, in FIG. 1, if the second ingress node 112 receives a notice of traffic failure on LSP 105 from the egress node 123, the second ingress node 112 may set its UFD flag to active in the UFD session between the second ingress node 112 and the egress node 123. As shown at 209, when the leaf node detects a change in heartbeat status on the secondary LSP, the leaf node may disregard traffic from LSP1 and may notify the root node of LSP1 that LSP1 failure has occurred and traffic is being forwarded on LSP2. For example, in FIG. 1, if the egress node 123 detects the UFD flag from second ingress node 112 changing from inactive to active, the egress node 123 may send a notice of switchover to first ingress node 111. As shown at 211, upon receipt of such notice, the root node of LSP1 may set its heartbeat status as inactive and cease forwarding traffic to the leaf node, completing the switchover. For example, in FIG. 1, if the first ingress node 111 received a notice of switchover from the egress node 123, the first ingress node 111 may set its UFD flag to inactive for transmissions over LSP 105.

Figure 3:
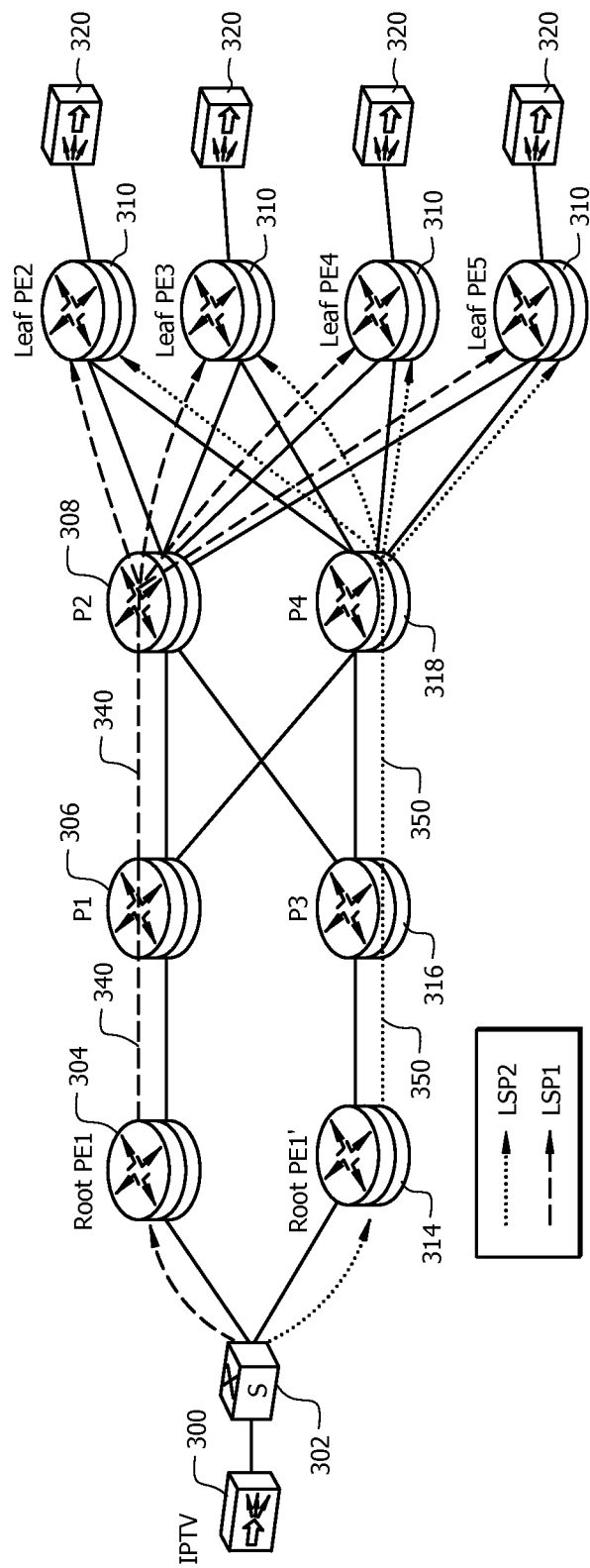
FIG. 3 depicts an embodiment of an illustrative network before failure of a head node on the primary LSP.
Figure 4:
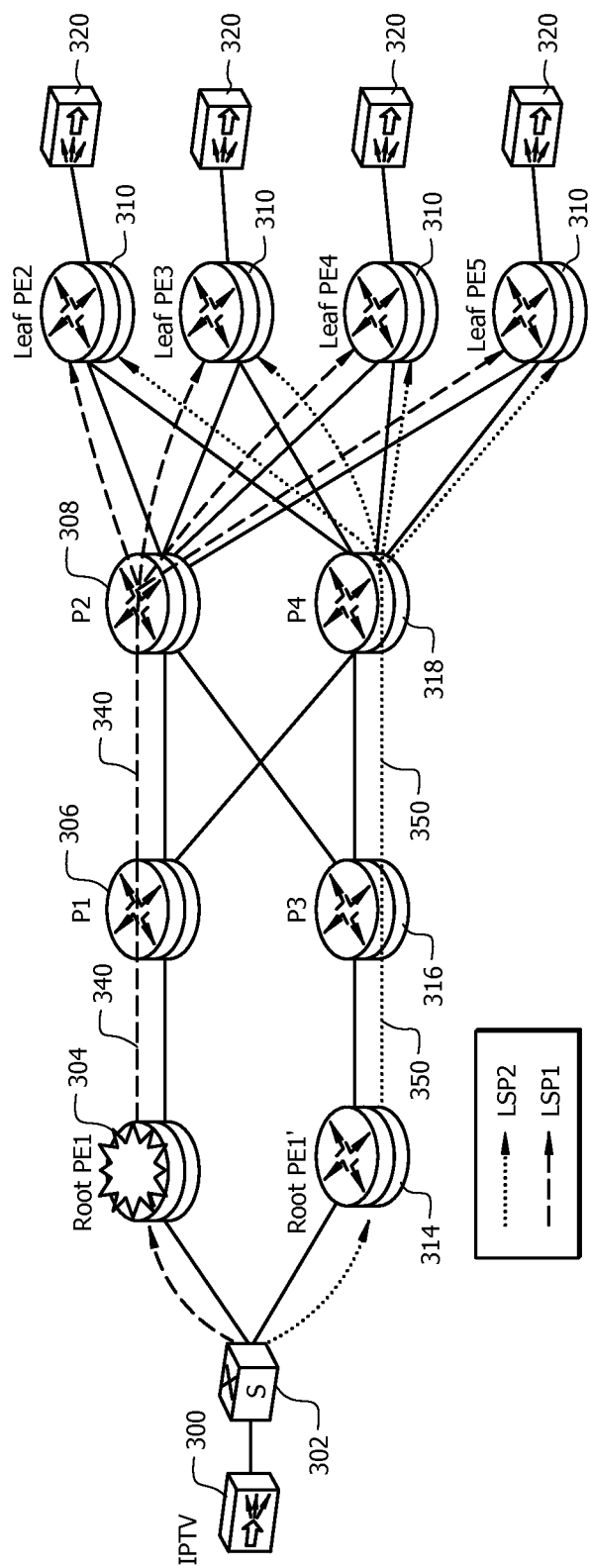
FIG. 4 depicts an embodiment of an illustrative network during failure of a head node on the primary LSP.
Figure 5:
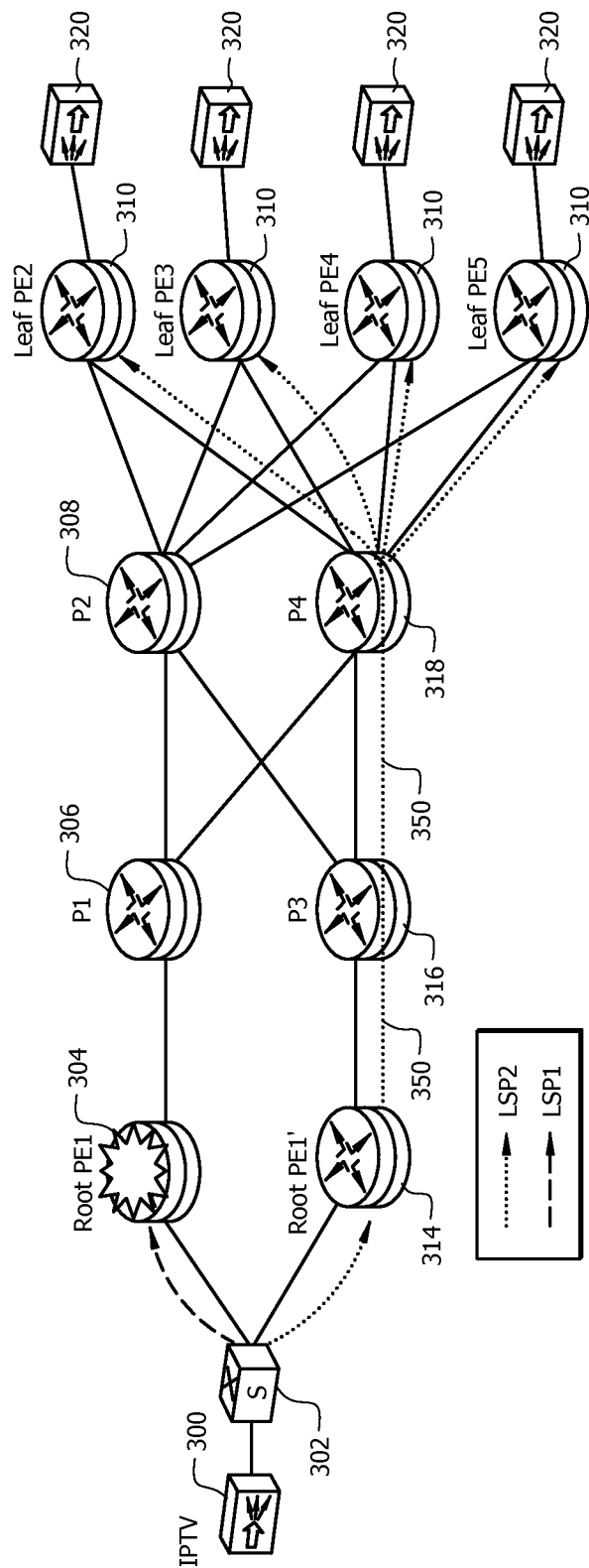
FIG. 5 depicts an embodiment of an illustrative network after failure of a head node on the primary LSP.

FIGS. 3, 4, and 5 depict an embodiment of an illustrative network before, during and after failure of a head node on the primary LSP. The network shown in FIGS. 3-5 may be similar to the network shown in FIG. 1. The tree of FIG. 3 begins with an external transmission source 300, e.g., an IPTV input, which may be configured to transmit data through an ingress node 302. The ingress node 302 may split the data into two paths. The primary path, LSP1 340, may begin with Root 304 (PE1), also referred to herein as a head node, root node or tree head, and may transmit data through internal nodes 306 (P1) and 308 (P2) to leaf nodes 310 (PE2, PE3, PE4 and PE5), also referred to herein as a tail-end node. The secondary path, LSP2 350, may begin with Root 314 (PE1') and may be configured to transmit data through nodes 316 (P3) and 318 (P4) to leaf nodes 310 (PE2, PE3, PE4 and PE5). Leaf nodes 310 (PE2, PE3, PE4 and PE5) may function as egress nodes, e.g., by transmitting data to external transmission destinations 320, which may be IPTV outputs. As depicted, the network nodes contained in LSP1 340 and LSP2 350 may be different and mutually disjoint with respect to each other. Also, LSP1 340 and LSP2 350, but not both, will typically transmit data to external transmission destination 320. In FIGS. 3-5, LSP1 340 is the primary LSP and LSP2 350 is the backup LSP. FIG. 4 depicts the embodiment of FIG. 3 with a failure of Root 304. FIG. 5 depicts the embodiment of FIG. 4 following switchover to LSP2 350. In FIG. 5, Root 314 (PE1') is the head node of the new primary LSP2 350, as described below.

With reference to FIGS. 3-5, the operation of the system may begin with the tree heads 304 and 314 setting up LSPs as well as data plane based failure detection session, also referred to as heartbeats, among the head nodes 304, 314, and leaf nodes 310. In the embodiment of FIGS. 3-5, the heartbeats are UFD sessions, but other data plane based failure detection session protocols are permissible. Once transmitting heartbeats on LSP1 340 and LSP2 350, heartbeats may be sent continuously by both head nodes 304 and 314 to leaf nodes 310, and leaf nodes 310 may expect to continuously receive heartbeats from both head nodes 304 and 314. The Root 304 (PE1) may transmit its heartbeat as active, e.g., by transmitting UFD messages with the active flag set on LSP1 340 to the leaf nodes 310. The Root 314 (PE1') may transmit its heartbeat as inactive, e.g., by transmitting UFD message with the inactive flag set on LSP2 350 to the leaf nodes 310. Blocks 201 and 203 in FIG. generally describe these operations.

If internal node 306 (P1) fails, as FIG. 4 depicts, the UFD messages from tree head 304 (PE1) may not be received by the leaf nodes 310. When a predefined number of UFD messages are not received by a leaf node 310 during the UFD session, the leaf node 310 may categorize the lack of receipt as a path failure and send a notification message to the tree head whose UFD messages are still being received by the leaf node 310. Block 205 in FIG. 2 generally describes this operation. The number of unreceived UFD messages needed to trigger a notification message may be optionally selected based on the desired system sensitivity, which is needs-dependent. Sensitive systems may risk sending erroneous notifications. Less sensitive systems may risk introducing failure response lag time. In one embodiment, a single un-received UFD message at a single leaf node 310 may trigger a notification message; in another, between two and ten un-received UFD messages may be required. Other embodiments may require more than ten un-received UFD messages at a leaf node 310 to trigger sending a notification message.

The Root 314 (PE1') may start forwarding the traffic when the Root 314 (PE1') receives a predetermined number of notification messages from a leaf node 310. The number of notification messages needed to trigger traffic forwarding may be optionally selected based on the desired system sensitivity, which is needs-dependent. Sensitive systems may risk beginning traffic forwarding on erroneous notification messages. Less sensitive systems may risk introducing additional response lag time. In one embodiment, a single notification message may trigger the forwarding; in another, between two and ten. Other embodiments require more than ten notification messages from a leaf node 310 to trigger traffic forwarding. Still other embodiments may require at least one notification message from two or more leaf nodes 310. The Root 314 (PE1') may initiate forwarding by sending its UFD messages with the active flag on LSP2 350 to the leaf nodes 310. Block 207 in FIG. 2 generally describes these operations. Once the Root 314 (PE1') initiates forwarding on LSP2 350 and a leaf node 310 detects the status change of the LSP2 350 heartbeat from inactive to active, any leaf nodes 310 still receiving traffic from LSP1 340 may discard packages from LSP1 340 and utilize packages from LSP2 350.

Once a leaf node 310 receives a heartbeat on LSP2 350 with a status change from an inactive to active, the leaf node 310 may send a second notification message to the previously active head node, Root 304 (PE1), that the switchover happened. Block 209 in FIG. 2 generally describes the operations of detecting the heartbeat status change on the previously inactive LSP and sending a notification of switchover to the root head of the previously active LSP. Once triggered, e.g., by a notification of switchover message from a leaf node 310, Root 304 (PE1) will stop forwarding traffic on LSP1 340 and change the status of the LSP1 340 heartbeats to inactive. Block 211 in FIG. 2 generally describes these operations. In one embodiment, a single switchover notification message received by Root 304 (PE1) may trigger the cessation of forwarding; in another, between two and ten. Other embodiments require more than ten notification messages from a leaf node 310 to cease traffic forwarding. Still other embodiments may require at least one notification message from two or more leaf nodes 310.

Because the solution utilizes the data plane and not the control plane, failure repair times can be achieved within milliseconds instead of seconds. Failure repair times under the disclosure may depend on several factors including, without limitation, the period of the UFD messages, the number of periods of UFD message non-receipt needed to trigger a notification from a leaf node, the number of leaf node notifications needed to trigger a change in traffic transmission from the backup LSP head node, the number of nodes required to provide notification to trigger a change in traffic transmission from the backup LSP head node, the time to receive a UFD message from the backup LSP head node with an updated status flag, the number of such UFD messages required to trigger the notice of switchover message, and the time to receive the switchover message and complete the switchover at the primary LSP head node. Failure repair times may optionally be adjusted depending on the needs of the application. Where a faster failure repair time is needed, failure repair times may be less than about 200 milliseconds, less than about 100 milliseconds, or less than about 10 milliseconds. Where the accuracy of failure detection is of a greater priority, longer failure repair times may be permitted to obtain multiple indications of a failure. Where the failure repair times are of a higher priority, spurious error messages and frequent switchovers may be acceptable.

Figure 6:
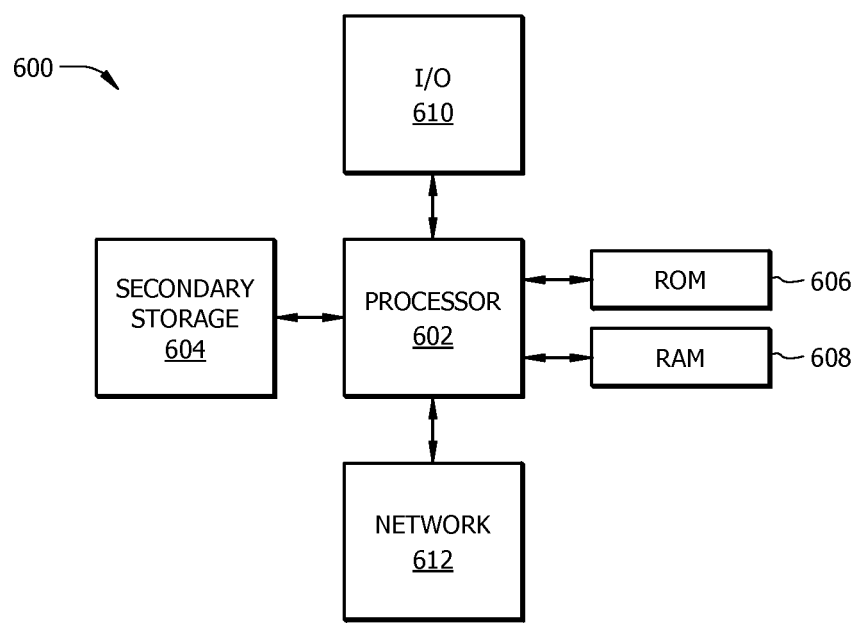
FIG. 6 depicts a typical general-purpose network component suitable for implementing one or more embodiments of the disclosed components.

The network components described above may be implemented on any general-purpose network component, such as those depicted in FIGS. 1 and 3-5, with sufficient processing power, memory resources, and network throughput capability to handle the necessary workload placed upon it. FIG. 6 illustrates a typical, general-purpose network component 1000 suitable for implementing one or more embodiments of the components disclosed herein. The network component 1000 includes a processor 1002 (which may be referred to as a central processor unit or CPU) that is in communication with memory devices including secondary storage 1004, read only memory (ROM) 1006, random access memory (RAM) 1008, input/output (I/O) devices 1010, and network connectivity devices 1012. The processor 1002 may be implemented as one or more CPU chips, or may be part of one or more application specific integrated circuits (ASICs) and/or digital signal processors (DSPs).

The secondary storage 1004 is typically comprised of one or more disk drives or erasable programmable ROM (EPROM) and is used for non-volatile storage of data. Secondary storage 1004 may be used to store programs that are loaded into RAM 1008 when such programs are selected for execution. The ROM 1006 is used to store instructions and perhaps data that are read during program execution. ROM 1006 is a non-volatile memory device that typically has a small memory capacity relative to the larger memory capacity of secondary storage 1004. The RAM 1008 is used to store volatile data and perhaps to store instructions. Access to both ROM 1006 and RAM 1008 is typically faster than to secondary storage 1004.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term about means±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

We claim:

1. In a root node along a second label switching path (LSP), a computer program product comprising computer executable instructions stored on a non-transitory medium that when executed by a processor cause the root node to perform the following:
   establish a first data plane based failure detection session having an inactive status along the second LSP with at least one leaf node, wherein the at least one leaf node is an edge node;
   receive a predetermined number of notification messages from the leaf node, wherein the predetermined number of notification messages indicate a failure of a second data plane based failure detection session along a first LSP from a second root node to the leaf node, wherein the root node and the second root node are different root nodes; and
   change the status of the first data plane based failure detection session to active along the second LSP upon receipt of the predetermined number of notification messages.

2. The computer program product of claim 1, wherein the first data plane based failure detection session is a unidirectional failure detection (UFD) session, and wherein the edge node is directly coupled to a network element disposed outside a network containing the edge node.

3. The computer program product of claim 1, wherein the predetermined number of notification messages is from one to ten.

4. The computer program product of claim 1, wherein the time between receiving a first notification message of the predetermined number of notification messages and changing the status is less than about 200 milliseconds.

5. In a leaf node of a network comprising a plurality of label switching paths, a network component comprising:
   a processor configured to:
   establish a first data plane based failure detection session with a first head node along a first label switching path (LSP), wherein the first data plane based failure detection session indicates an active status for the first LSP;
   establish a second data plane based failure detection session with a second head node along a second LSP, wherein the second data plane based failure detection session indicates an inactive status for the second LSP, and wherein the first head node is different than the second head node; and
   send at least one notification message to the second head node upon a trigger event, wherein the notification message indicates a transmission failure along the first LSP,
   wherein each of the first head node and the second head node is an edge node.

6. The network component of claim 5, wherein the processor is further configured to receive a status update on the second data plane based failure detection session updating the status of the second LSP to active, and wherein the edge node is directly coupled to a source node in an external network.

7. The network component of claim 6, wherein the processor is further configured to send a switchover status message to the first head node indicating the change in the status of the second LSP.

8. The network component of claim 7, wherein the processor is further configured to receive a switchover update updating the status of the first LSP to inactive.

9. The network component of claim 6, wherein the processor is further configured to disregard traffic on the first LSP following receipt of the status update.

10. The network component of claim 6, wherein the processor is further configured to send additional notification messages at a predefined interval after the trigger event until the status update is received.

11. The network component of claim 5, wherein the first and second data plane based failure detection sessions are unidirectional failure detection (UFD) sessions.

12. The network component of claim 11, wherein the trigger event is the non-receipt of a predetermined number of UFD messages on the first LSP following establishment of a first UFD session.

13. The network component of claim 12, wherein the predetermined number is from one to ten.

14. In a network system comprising a plurality of label switching paths with at least one leaf node, a method of switching transmission from a first label switching path (LSP) to a second LSP upon failure in the first LSP comprising:
   establishing the first LSP, wherein the first LSP originates at a first head node;
   establishing a first data plane based failure detection session between the first head node and the at least one leaf node on the first LSP, wherein data plane based failure detection session messages indicate that the first LSP is active;
   establishing the second LSP, wherein the second LSP originates at a second head node, and wherein the first head node is different than the second head node;
   receiving an indication that the first LSP failed, wherein the indication comprises non-receipt of at least one data plane based failure detection session message from the first head node; and
   sending a notification message to a second head node indicating failure of the first LSP from the at least one leaf node.

15. The method of claim 14, further comprising establishing a second data plane based failure detection session between the second head node and the at least one leaf node on the second LSP, wherein data plane based failure detection session messages indicate that the secondary LSP is inactive.

16. The method of claim 15, further comprising:
   forwarding traffic along the second LSP in response to the notification message from the at least one leaf node; and
   sending the data plane based failure detection session messages indicating that the second LSP is active in response to the notification message from the at least one leaf node.

17. The method of claim 16, further comprising sending a switchover notification message to the first head node indicating that a switchover has occurred following data plane based failure detection.

18. The method of claim 17, further comprising sending the data plane based failure detection session messages indicating that the first LSP is inactive.

19. The method of claim 16, wherein the time between sending a notification message and sending the data plane based failure detection session messages indicating that the second LSP is active is less than about 200 milliseconds.

20. The method of claim 14, further comprising sending a notification message to the first head node indicating that a switchover has occurred.

* * * * *